United States Patent
Rosa

[15] 3,707,648
[45] Dec. 26, 1972

[54] INVERTER APPARATUS AND METHOD FOR HIGH FREQUENCY FLUORESCENT LAMP OPERATION

[72] Inventor: John Rosa, Pittsburgh, Pa.

[73] Assignee: Westinghouse Electric Corporation, Pittsburgh, Pa.

[22] Filed: Sept. 28, 1970

[21] Appl. No.: 75,917

[52] U.S. Cl..............315/231, 315/DIG. 5, 315/244, 315/283
[51] Int. Cl.............................................H05b 37/00
[58] Field of Search ......315/100 T, 100 U, 227, 231, 315/244, 253, 258, 283

[56] References Cited

UNITED STATES PATENTS 3,189,790  6/1965  Nuckolls..........................315/246 X
3,209,203  9/1965  Gurnick et al......................315/258

Primary Examiner—Roy Lake
Assistant Examiner—Lawrence J. Dahl
Attorney—A. T. Stratton and W. D. Palmer

[57] ABSTRACT

Apparatus and method for operating fluorescent lamps with high frequency AC inverted from a DC source comprises a thyristor bridge having an inductor in circuit therewith. The bridge is adapted to be connected directly to the power source and is also adapted to be disconnected therefrom to permit "free-wheeling" operation of the lamps from energy previously stored in the inductor. For a part of each operating half cycle, energy previously stored in the inductor is used to operate the lamps with the power supply being disconnected, and for the remainder of the half cycle, the lamps are operated directly from the power source and energy is stored in the inductor for lamp operation during a part of the next half cycle.

8 Claims, 14 Drawing Figures

Q1, Q4 & FREEWHEEL THYRISTOR VOLTAGES

INVERTER APPARATUS AND METHOD FOR HIGH FREQUENCY FLUORESCENT LAMP OPERATION

BACKGROUND OF THE INVENTION

This invention generally relates to inverter apparatus for operating an electrical load and, more particularly, to an inverter apparatus for operating fluorescent lamps with high frequency AC which is inverted from a DC source.

The use of thyristor or transistor inverters to drive fluorescent lamp loads has been investigated in considerable detail and has been commercialized for special applications. In such system, the fluorescent lamps normally are operated with high frequency, such as 3000Hz, which permits the use of small capacitive lamp ballasts and also improves the operating efficiency of the lamps. An inverter apparatus for operating fluorescent lamps is described in U.S. Pat. No. 3,341,737, dated Sept. 12, 1967.

Since fluorescent lamps, as well as other discharge devices, normally exhibit a negative resistance characteristic, the voltage supplied to the inverter has been regulated to the correct level necessary to prevent current runaway. Because of this runaway characteristic and the inverter requirement of matching lamp voltage and DC supply voltage, the use of a fixed DC supply has been precluded. In the usual inverter apparatus, the DC voltage supply is regulated with phase angle control so that it matches the lamp voltage. Because of this, the system takes power at a lagging power factor, and the greater the difference between the lamp and supply voltage, the greater the deviation of the power factor from unity.

SUMMARY OF THE INVENTION

There is provided an apparatus and method for operating capacitor-ballasted discharge devices with predetermined high-frequency AC energy inverted from a DC source. A thyristor bridge has in circuit therewith an energy storing and delivering inductor and the individual thyristors are actuated by a switching means which is responsive to a lamp operating condition. The thyristor switches, together with the associated conductors and storage inductor, are arranged in two basic circuits, each of which has two operating arrangements or modes. In the first operating mode of the first circuit, the inductor connects in circuit with the fluorescent lamps to operate same with energy which was previously stored in the inductor. The first circuit is then shifted to a second operating arrangement wherein current of the same direction is caused to flow through the lamps directly from the DC source and simultaneously electrical energy is stored in the inductor. In the second basic circuit, which also is connected into different operating modes, the inductor is initially connected in circuit with the lamps to operate same from electrical energy which was previously stored in the inductor, with the current through the lamps being reversed. In the second operating mode of the second circuit, the lamps again are operated directly from the power source with the current reversed, with electrical energy simultaneously stored in the inductor for operation during a following period. In all cases, the flow of electrical current into the inductor during energy storage is in the same direction and the thyristors are actuated rapidly and repetitively to repeat the foregoing operating sequence.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

Inverter Power Circuit

Figure 1:
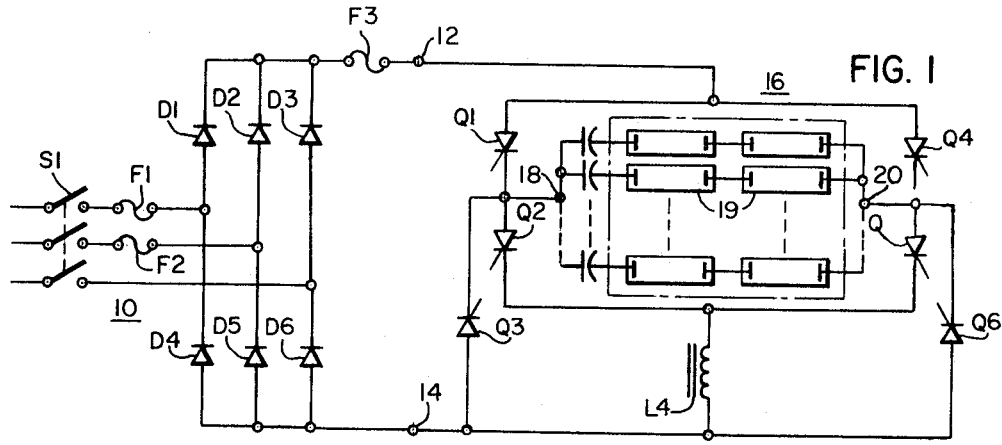
FIG. 1 is a circuit diagram of the basic self-regulating inverter, including the DC source.

As shown in FIG. 1, a conventional diode rectifier bridge 10 provides at the input terminals 12, 14 of the inverter apparatus a predetermined DC potential. The inverter apparatus 16 has output terminals 18, 20 across which the load is connected. In the embodiment as shown, the output terminals connect to a series or plurality of pairs of terminals across which the lamps 19 to be operated are connected. As a matter of convenience, two series connected lamps are connected across each pair of output terminals. Each of the lamps has a capacitor C4 connected in series therewith.

Considering the basic self-regulating inverter in greater detail, a fixed DC voltage greater than the lamp voltage is supplied to the circuit by a rectifier bridge formed by diodes D1 through D6. Thyristors Q1, Q2, Q4 and Q5 form a conventional bridge. The regulating action of the inverter is obtained through the addition of thyristors Q3 and Q6.

Figure 2:
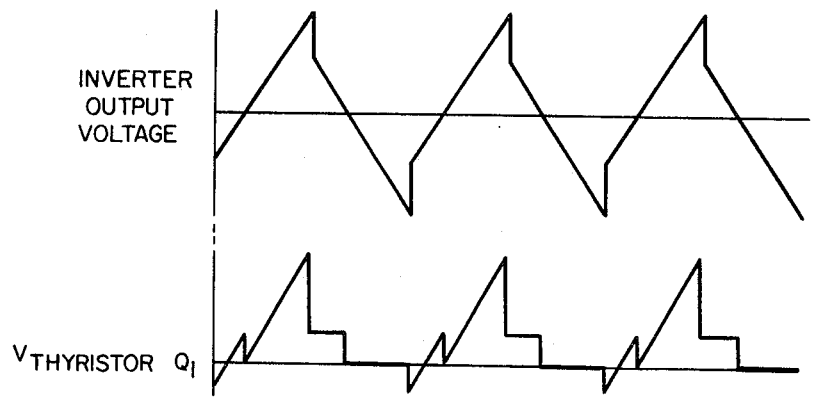
FIG. 2 illustrates pertinent waveforms for the inverter shown in FIG. 1, including inverter output voltage, the voltage which appears across one of the thyristors, the voltage which appears across the inductor, the thyristor conduction sequence, and the lamp current.
Figure 2:
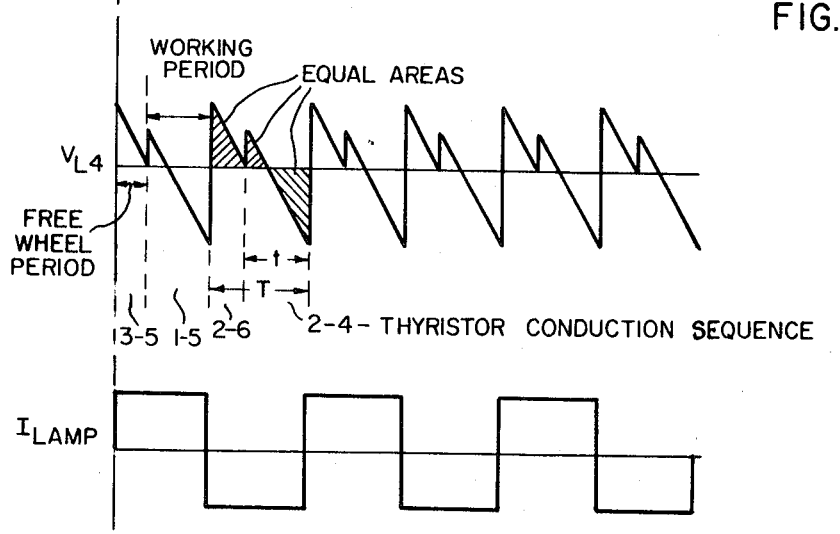

Pertinent waveforms for the operation of the inverter circuit are shown in FIG. 2, including the inverter output voltage, the voltage which appears across Q1, the voltage which appears across the energy storage inductor L4, the thyristor conduction sequence and the resulting current through the fluorescent lamp load. More specifically, assume that the inverter is running, current has been established in the inductor L4 and is flowing from the supply via thyristor Q1, the load and thyristor Q5. When the capacitors, C4, are charged to the desired $V_C$ peak, thyristors Q6 and Q2 are fired (rather than Q4 and Q2 as in a conventional bridge circuit); Q1 and Q5 are commutated and the load current abruptly reverses. The capacitors, C4, are now charged in the opposite direction. Current ceases to flow from the supply, the load current being maintained via Q6 and Q2 by the freewheeling action of the inductor L4. After some interval, thyristor Q4 is fired, commutating Q6. Load current maintains the same direction but now flows from the supply. When the capacitors, C4, reach $V_{C\ peak}$, Q3 and Q5 are fired, Q2 and Q4 are commutated, and another half cycle is initiated.

The conditions for equilibrium in the circuit may again be seen by considering either the inductor voltage waveform or supply and the load powers. For given supply and lamp voltages, zero mean voltage can only be obtained across the inductor by correctly setting the ratio of "freewheel" to "working" times. If the current flowing in the inverter inductor, $I_L$, is considered to be constant over a half cycle then the inverter output power is $V_{Lamp} \times I_L$. Power is only drawn from the DC supply when current flows from it through either thyristor Q1 or Q4. If T is the half cycle period of the inverter and t is the duration of time that the current $I_{DC}$ flows from the supply, then for a lossless inverter:

$$(I_{DC} \times V_{DC}) t/T = I_L \times V_{Lamp}$$

It can be seen that the inverter may be considered to be similar to the simple bridge inverter, with no freewheel period, operating from a DC supply voltage of $[V_{DC} \times t/T]$. As with the simple bridge, the lamp and supply voltages must match for a stable condition. Therefore, $$V_{Lamp}/V_{DC} = t/T$$

The relative time that the inverter 'works' (that is, take power from the supply) and 'freewheels' is determined only by this ratio of lamp and supply voltages. Deviation from this ratio will lead to an unstable increase or decrease of circuit current. A consideration of the inductor voltage waveform shown in FIG. 2 will show that zero DC voltage across the inductor is only obtained with this same time ratio.

It should be pointed out that the inverter circuit of FIG. 1 could find application for loads other than fluorescent lamps. It may be considered as a simple bridge inverter fed from a variable DC supply and as such is capable of producing a wide range of output voltage, or conversely producing a constant output for a wide variation of supply voltage. In such applications the commutating capacity could possible be used in series or in parallel with the load. Where the load does not exhibit the negative resistance characteristics of fluorescent lamps it is not, of course, necessary to restrict the ratio of freewheel and working times.

The voltage across the lamp the ballast may exceed the permissible line to line output voltage (300 Volt rms). The output voltage may be reduced to the same level as that of a simple bridge inverter by incorporating a series capacitor in the inverter module. This capacitor, connected in series with the output to the lamps, may be used to drop excess voltage within the inverter itself. Such an arrangement may provide some additional benefit to the system in that it prevents all the commutation capacity of the inverter being shorted out by a fault at the load. The voltage drop across the capacitor will depend on the total load on the inverter. Variations in the number of lamps conducting will result in slight variations in the current in the individual lamps. This will be explained in more detail later.

Figure 3:
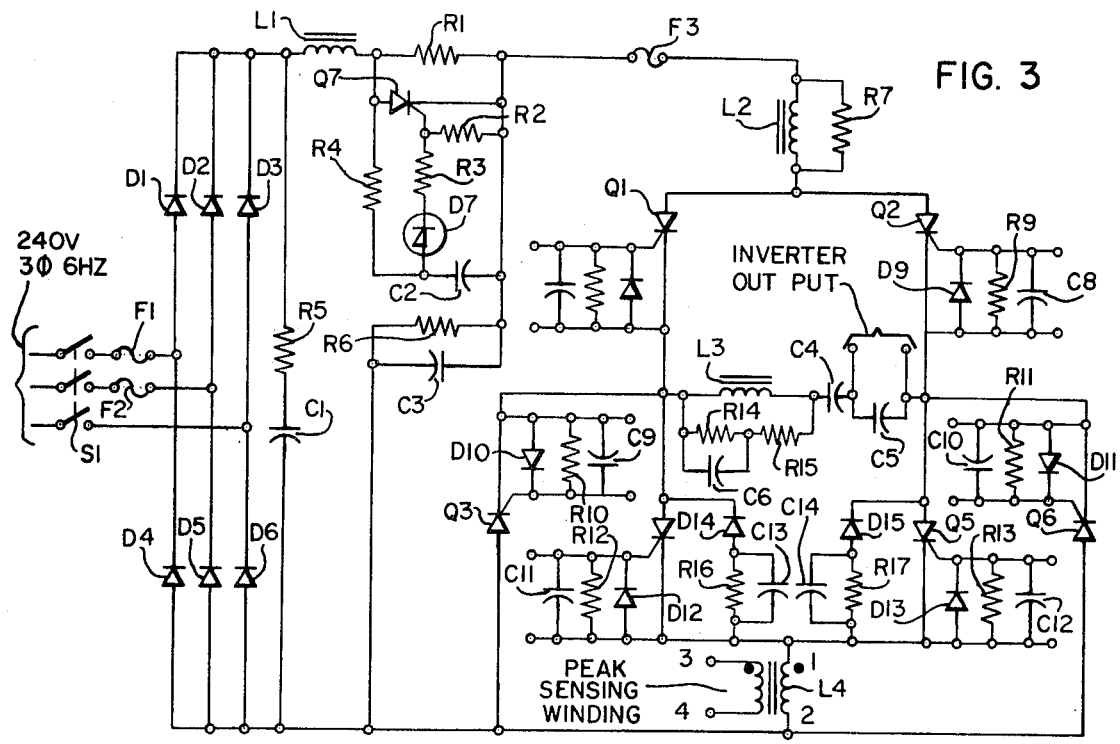
FIG. 3 is a complete detailed inverter and power supply schematic circuit, corresponding to the basic circuit shown in FIG. 1.

The detailed power circuit is shown in FIG. 3. The inverter 16 incorporates several additional components that are used because of the practical limitations of the thyristors. For example, to prevent high $di/dt$ in the thyristors when they are turned on two inductors are used. $L_3$ limits the rate of change of current through the load and so protects Q2, Q6, and Q3, Q5 when they are turned on. It does not protect Q1 or Q4 since under normal running conditions they would immediately take whatever current is flowing in $L_3$. $L_3$ would only slow down any further increase in current. $L_2$ serves to limit $di/dt$ in Q1 and Q4 when they are turned on.

Inductors $L_3$ and $L_2$ produce voltage transients due to the abrupt manner in which reverse current ceases when a thyristor is commutated. Resistors connected across these inductors serve to reduce the voltage transients which would otherwise tend to produce excessive voltage across the thyristors.

Simple resistive damping is acceptable across $L_2$ which has a smaller switching voltage across it than $L_3$. $L_3$ has a substantial switching voltage across it as the load current is reversed. Simple resistive damping of the inductor is limited by two factors, power loss and $di/dt$. As the value of shunt resistance decreases, the power loss reaches unacceptable values. In addition to this, the current through the resistance produces high $di/dt$. In order to reduce power loss, the negative damping of $L_3$ is a CR circuit arranged to have a reasonably low resistance for high voltage transients and a higher resistance for the low frequency components of the waveform across $L_3$.

The action of the diode, resistance, and capacitor circuits across Q2 and Q5 may be explained by considering that thyristors Q1 and Q5 are conducting. When the freewheel period is initiated Q2 and Q6 receive gate drive. Thyristor Q1 will initially continue to conduct as will Q5. The current reverses through $L_3$ in about 2 μS and reverse current starts to flow through Q5. During this time, Q1, Q2 and Q5 cathodes and anodes are at the positive supply voltage level thus reverse biasing Q6. When Q5 abruptly ceases to conduct reverse current, Q6 will again become forward biased. Although Q6 has gate drive on it, the fast voltage transient that appears across it, and across Q4, is not clipped by Q6 until Q6 has been forward biased for about half a microsecond. Increased gate drive to Q6 results in only marginal reduction of this spike. In order to limit and slow down this spike the diode, resistor, capacitor circuit is connected across Q5 (and similarly across Q2 for the other half cycle). The spike is absorbed by the CR, with the diode conducting during this time. After charging the capacitors, the diode ceases to conduct. By the time that Q5 is ready to be triggered half a cycle later, the capacitor has discharged through the resistor. The suppression circuit therefore does not introduce any $di/dt$ problems for the thyristor which it shunts. Specific values for each of the circuit components will be listed hereinafter.

A capacitor C5 is used to shunt the output terminals of the inverter. The primary purpose of this is to provide adequate commutation ability for the inverter during the switch on period when the lamps are heating and do not conduct current. The value required here depends on the total effective Q of the inverter circuit. This is determined by the drive frequency, the capacitor shunting the output terminals, the inverter main inductor, and the nature of the load. The worst load condition is when the lamp heater transformers (not shown, and which are conventional) are connected directly across the output lines since they then tend to discharge the shunt capacitor. Too low a starting frequency under these conditions may result in a commutation failure. The networks connected to the inverter thyristor gates provide protection against the thyristors being falsely gated "on", due to noise problems. The operating frequency chosen for the inverter is typically 2.5 kHz.

The manner in which fluorescent lamps behave during their initial striking poses problems for the inverter. Erratic striking of the lamps can lead to loss of commutation in the inverter with consquent inverter failure. Such faults occur randomly depending on the striking order of the lamps forming the load and the manner in which they strike. During this period of erratic striking, some of the lamps strike during a half cycle and then extinguish during or at the end of the half cycle. During the half cycle that the lamps are struck, the inverter current is high and the peak sensing level is reached resulting in the turn off time diminishing to the normal peak sensing mode turn off time (see FIG. 9). If at this time a large number of struck lamps have extinguished, the turn off time is drastically reduced. This is due to the face that that the previously high load current now flows into the remaining load. This charges the remaining load capacitance at a much faster rate and shortens the turn off time. A further complication arises from the fact the lamps themselves, although nominally of negative V-I-characteristics to slow changes of current through them, exhibit a high impedance to sudden transient currents. Consequently, when the sudden increase in current to the struck lamps takes place, the lamp voltage rises rapidly. This further detracts from the reverse bias available for the thyristors since the voltage available is governed by the difference between the lamp voltage and ballast capacitor voltage. If a large number of lamps extinguish, the turn-off time becomes insufficient to commutate the thyristors and a commutation fault may occur. The solution to solve this problem was to apply reduced voltage to the inverter for the first second after switch on. During this time heater power is supplied to the lamps and some of the lamps strike. When full voltage is then applied to the inverter, the rest of the lamps come on in a regular manner.

The change in voltage level applied to the inverter is obtained by using a parallel resistor-thyristor combination in series with the DC supply to the inverter (see FIG. 3). Initially the thyristor Q7 is nonconducting and the resistor R1 keeps the voltage to the inverter low. The series thyristor is triggered by a simple delay circuit employing a trigger diode D7. When this diode breaks over, the thyristor Q7 conducts and bypasses R1. The thyristor gate drive time constant must be long enough to ensure that gate drive is still present for several milliseconds after triggering the thyristor. This is necessary because the LC circuit of the power supply rings following the shorting of R1 and this may put the current in the thyristor momentarily to zero.

The starting circuit is connected between the inductor L1 and capacitor C3 of the rectifier filter. The current at this point is not discontinuous, as it is after the capacitor due to inverter freewheeling, and hence continuous gate drive is not required. The inverter fuse is connected after the capacitor in order to give maximum protection of the inverter thyristors. Line fuses are used to clear faults occurring in the bridge or smoothing circuits. The resistance-capacitor circuit shunting the output of the rectifier bridge provides transient suppression to protect the diodes.

Inverter Control Circuit

The control circuit for the inverter must fire the six thyristors in a manner which ensures that the 'freewheel' to 'working' time ratio is exactly that required to stabilize current in the circuit. Variations in supply or lamp voltage must be automatically compensated for to prevent current runaway. In addition to this, the control circuit should be capable of running the inverter for the period before the lamps strike. During this time, 'freewheeling' is not used because voltages in the circuit are inadequate for commutation in that mode. As lamps strike and circuit voltage increases, the control circuit should move smoothly into the 'normal' operating mode employing 'freewheeling' and working periods.

Figure 4A:
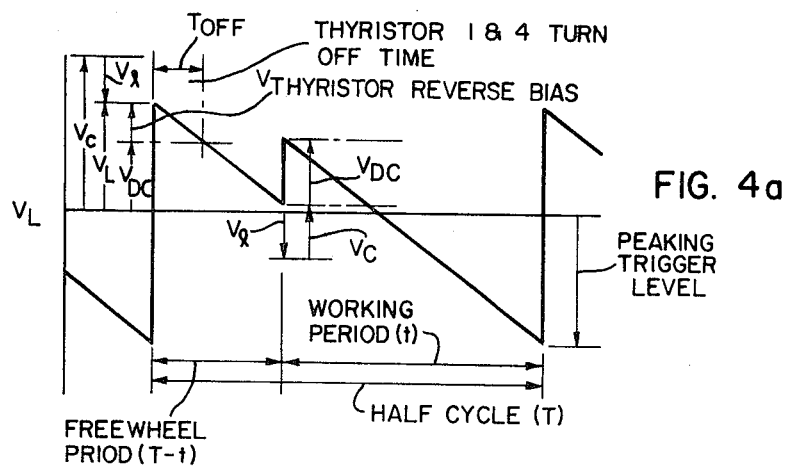
FIGS. 4a and 4b illustrate representative voltages which appear across the energy storing and delivering inductor.
Figure 4B:
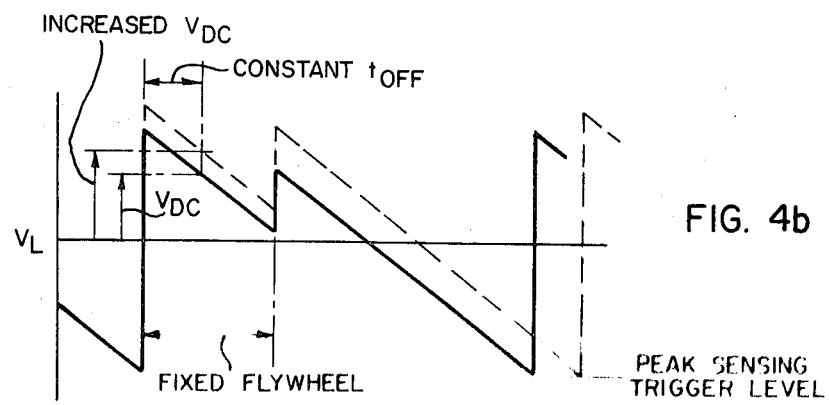

Sensing of the inverter inductor voltage provides a means of achieving a simple control by providing a convenient measure of the inverter voltage and current. Some representative inductor voltages are shown in FIG. 4a. The negative voltage across the inductor is sensed when this reaches a prescribed level the control circuit is triggered to produce a load current reversal and start a freewheel period. The use of a fixed trigger level results in ensuring a constant turn-off time for the upper thyristors as supply voltage varies. An increase in supply voltage results in an increased charge on the commutating capacity before the negative triggering level is reached across the inductor, see FIG. 4b. Use of the inductor voltage in this manner, therefore, ensures adequate commutation and at the same time limits the build up of voltage across the thyristors. Also, since the change of voltage across the inductor in a half cycle is equal to the change in voltage across the commutating capacity, it provides a measure of the load current. For fixed circuit voltage this current will be determined by the operating frequency.

Figure 5A:
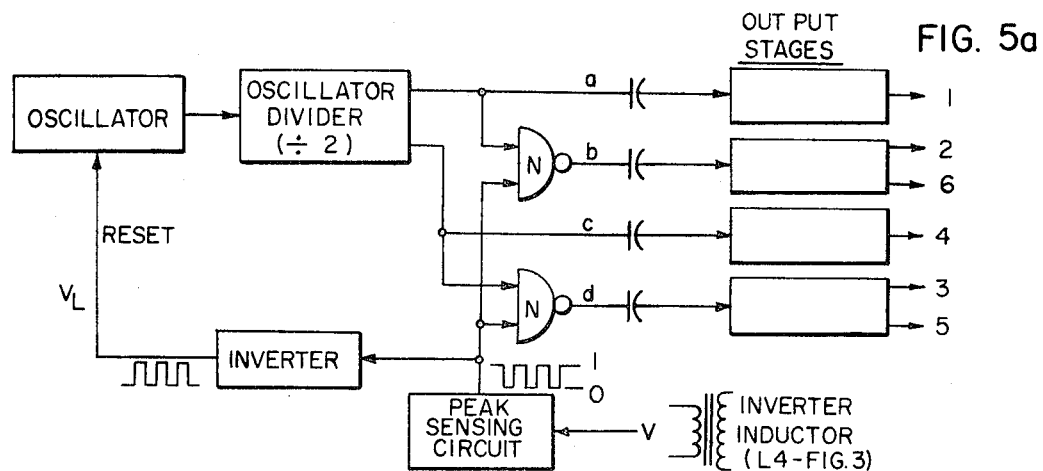
FIGS. 5a and 5b set forth a block diagram and synchrograms for the control circuit which controls the triggering of the thyristors of the power circuit.
Figure 5B:
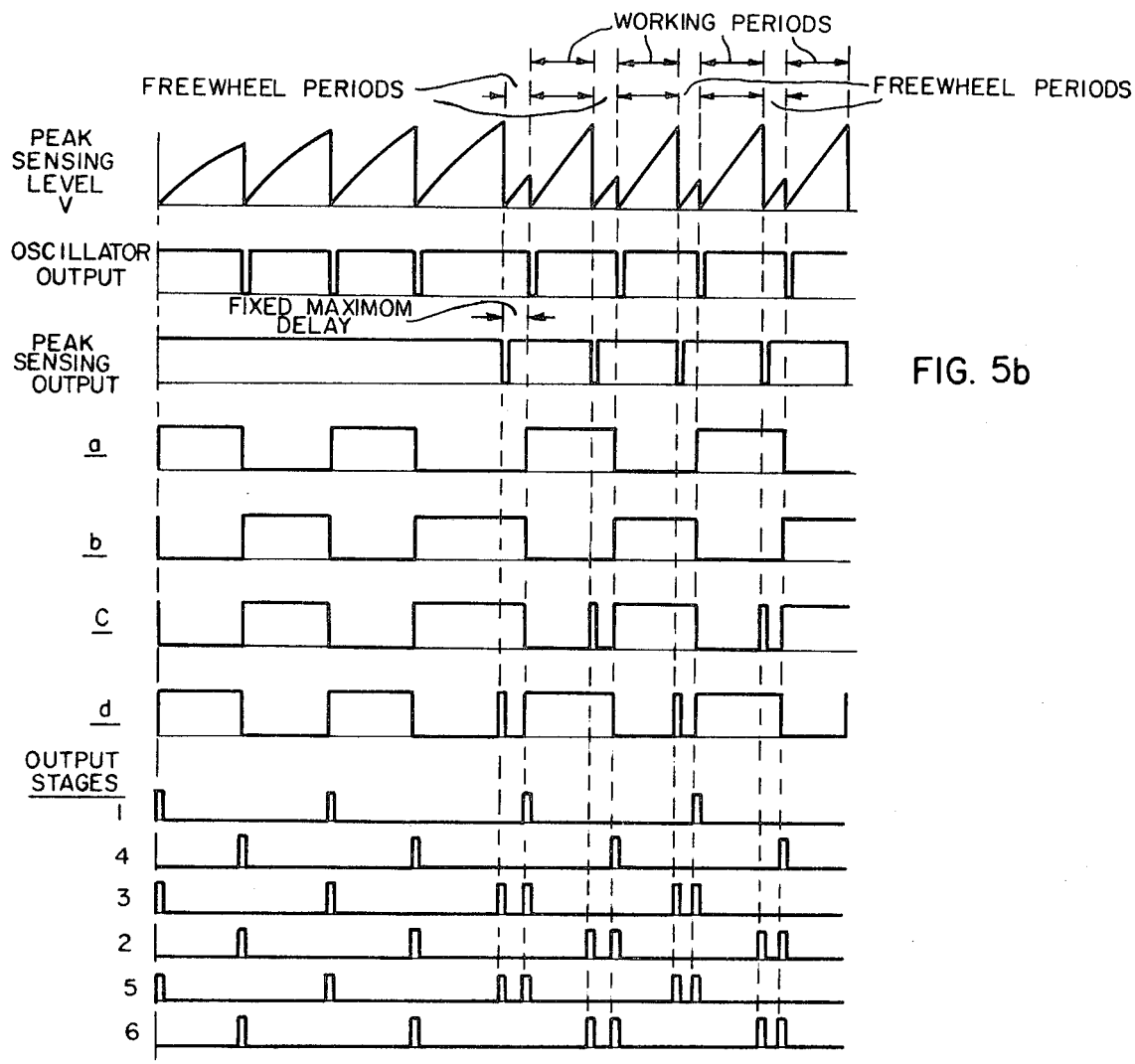

Further details of the operation will be explained in conjunction with the control unit shown in FIG. 5a in block diagram form with associated synchrograms shown FIG. 5b. The oscillator, as described hereinafter, has an output which is divided by two and alternately drives the trigger output stages for thyristor Q1 and Q4. Also via NAND gates E and F the trigger output stages for thyristors Q2, Q6 and Q3, Q5 are driven such that at the time of one oscillator pulse Q1, Q3 and Q5 are triggered while Q2, Q4 and Q6 are triggered at the next pulse. The output of the peak sensing circuit is normally positive (logic 1). When the inductor voltage causes the peak sensing detector to trigger, a logic 0 is produced momentarily. Gates E and F have a logic 1 output if either one or both inputs are at logic 0 and have a logic 0 output if both inputs are at logic 1. Thus, as long as the peak sensing circuit is not being triggered, gate drive is alternately delivered in thyristors Q1, Q2, Q6 and Q4, Q3, Q5. Freewheel thyristors Q3 and Q6, however, will not conduct as long as their triggering coincides with the triggering of their associated 'working' thyristor, Q1 or Q4. Consequently, the inverter initially operates as a simple bridge, i.e., without freewheeling. The inverter operates in this mode when first switched on since the only load is that provided by the lamp heaters. As lamps start to strike, voltages in the inverter increase until the peak sensing circuit in the control starts to trigger. The resulting logic 0 pulses are fed to NAND gates E and F. The oscillator divider controls these gates such that, in conjunction with the peak sensing pulse, only one of the trigger output circuits will be actuated. If thyristors Q1 and Q5 are conducting, then the peak sensing pulse will cause triggering of Q2, Q6 and subsequent freewheeling. With Q2, Q4 conducting, the pulse will cause firing of Q3, Q5 as shown in the synchrograms of FIG. 5b.

Figure 6:
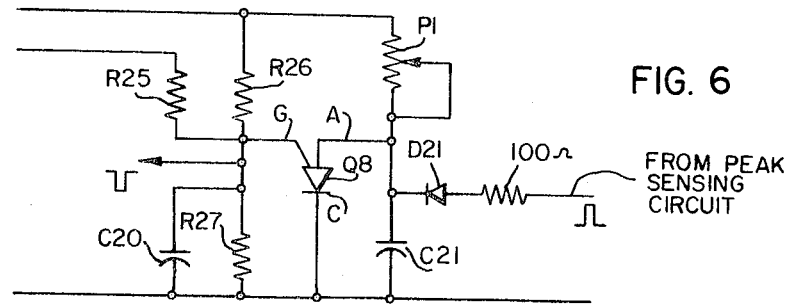
FIG. 6 is a detail showing of the oscillator shown in block form in FIG. 5.

The peak sensing pulses will normally first occur close to the time that the oscillator triggers. Under these conditions the oscillator frequency remains unchanged ($T$ = const). The freewheel period will gradually increase as the inverter circuit moves towards the freewheel/working ratio ($t/T$) required for equilibrium conditions in the inverter. When the freewheel time reaches a certain value, it is limited ($t$ = const) and the oscillator frequency then increases ($T$ decreases) to continue the balancing of freewheel and working times. The method of achieving this action is illustrated in FIG. 6 which shows in detail the oscillator of FIG. 5a. The circuit uses a programmable unijunction Q8 with simple RC timing.

Figure 7:
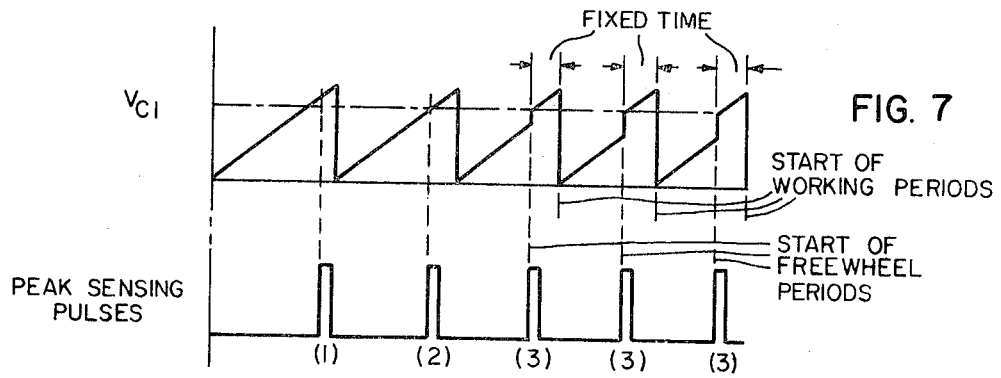
FIG. 7 is a representation of the signal output of the oscillator circuit shown in FIG. 6.

More specifically, with no peak sensing pulses generated, the oscillator runs at a frequency determined by the time taken to charge C21 to the breakdown voltage of the unijunction Q8. This breakdown voltage is set by the potential of the unijunction gate terminal. When pulses are generated by the peak sensing detector they are inverted and applied to the oscillator timing capacitor via diode D21. If at the time that the pulse occurs, the oscillator capacitor is more positive than the pulse applied to D21, the diode will block and the oscillator frequency will not be affected. If the capacitor is less positive at that time it will be charged to the fixed voltage of the pulse and the oscillator will trigger a fixed time later. This constitutes the maximum length the freewheeling period can take. FIG. 7 illustrates this action. In conditions (1) and (2) the capacitor charging is not altered by the pulse whereas it is in condition (3). It can be seen therefore that the peak sensing pulse will have no effect on the oscillator frequency until the freewheel period has increased to a prescribed maximum. Any further tendency for the freewheel period to increase results in bringing forward the triggering of the oscillator and a subsequent increase in oscillator frequency. The timing of the peak sensing pulse is determined by the rate of change of voltage across the inverter commutating capacity, since this controls the time taken for the inverter inductor voltage to reach the trigger level. Once the freewheeling period becomes limited, increasing circuit current results in bringing forward the peak sensing pulse and hence increasing the drive frequency. However, as the frequency increases, the transient DC component of the voltage across the inverter inductor L4 decreases and eventually an equilibrium condition is established.

In practice it is desirable to ensure that a peak sensing pulse which occurs just as the oscillator triggers does not charge the timing capacitor C21. To avoid this overlap it is arranged that the oscillator clamps the timing capacitor voltage to zero level for about 20 $\mu$S immediately after it triggers. Thus, a peak sensing pulse delivered during this interval is ineffective.

Figure 8:
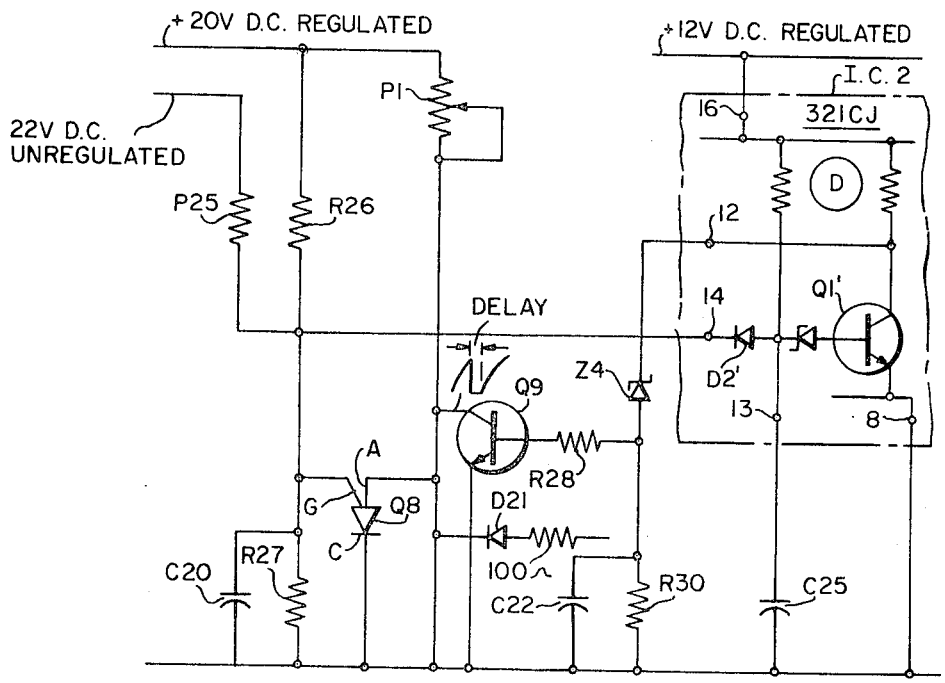
FIG. 8 is a circuit diagram showing the arrangement which is used to control the output of the oscillator.

FIG. 8 shows the basic scheme used to achieve this action. The short logic 0 period which occurs at the gate of the unijunction is stretched in the diode D2' capacitor C25 circuit at Q1' base. The widened pulse out of Q1' is then used to drive the clamping transistor Q9. Q9 thus not only prevents charging the timing capacitor during the first 20 $\mu$S following the oscillator triggering, but it also ensures a fixed starting voltage for the timing circuit.

Figure 9:
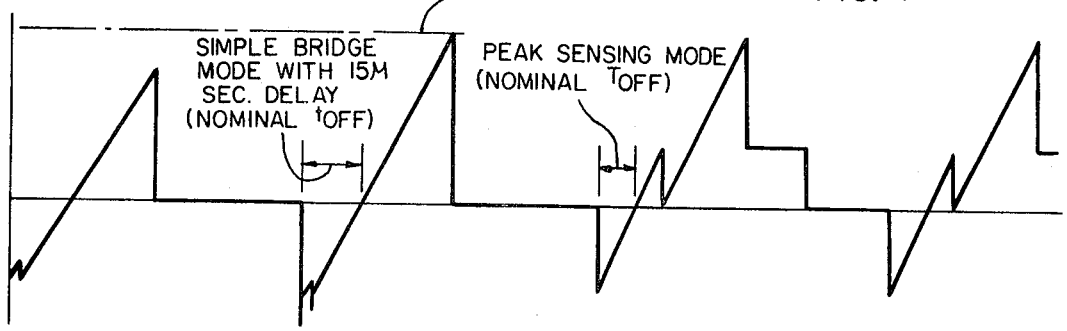
Fig. 9 sets forth the thyristor voltages during various modes of operation.
Figure 10:
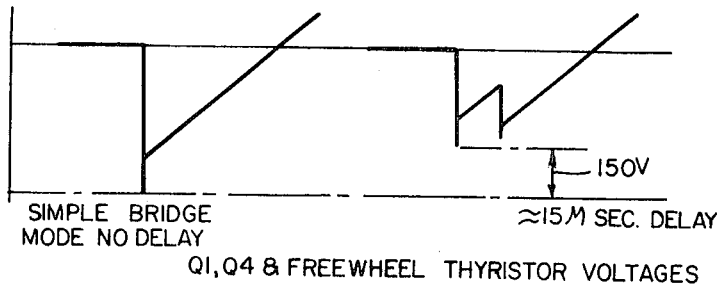
FIG. 10 illustrates typical waveforms for the thyristors.

One other feature of the control should be explained before the complete practical circuit is described. Before the peak sensing becomes operative, that is during lamp warm up, the inverter runs basically as a simple bridge with the exception of an extremely short freewheel period. Under normal running conditions, however, there is always a significant freewheel period and this results in lowering the thyristor voltages. Representative thyristor voltages, before and after the peak sensing is operative, are shown in FIG. 9. It can be seen that the peak reverse voltage across the freewheel thyristor is less when there is a freewheel period. In order to reduce peak thyristor voltages which occur just as the peak sensing is about to become operative, the simple bridge mode of operation has been modified so that the inverter is always run with a short freewheeling period. This is achieved by slightly delaying the waveforms controlling the gate drive circuits of thyristors Q1 and Q4. Although only about 15 $\mu$S freewheeling is introduced, a significant voltage reduction can be achieved in this manner. The short delay is sufficient to effect the amplitude of narrow voltage spikes which occur in practice. FIG. 10 shows some typical waveforms achieved in practice, a saving of about 150V in peak thyristor voltage being realized.

Figure 11:
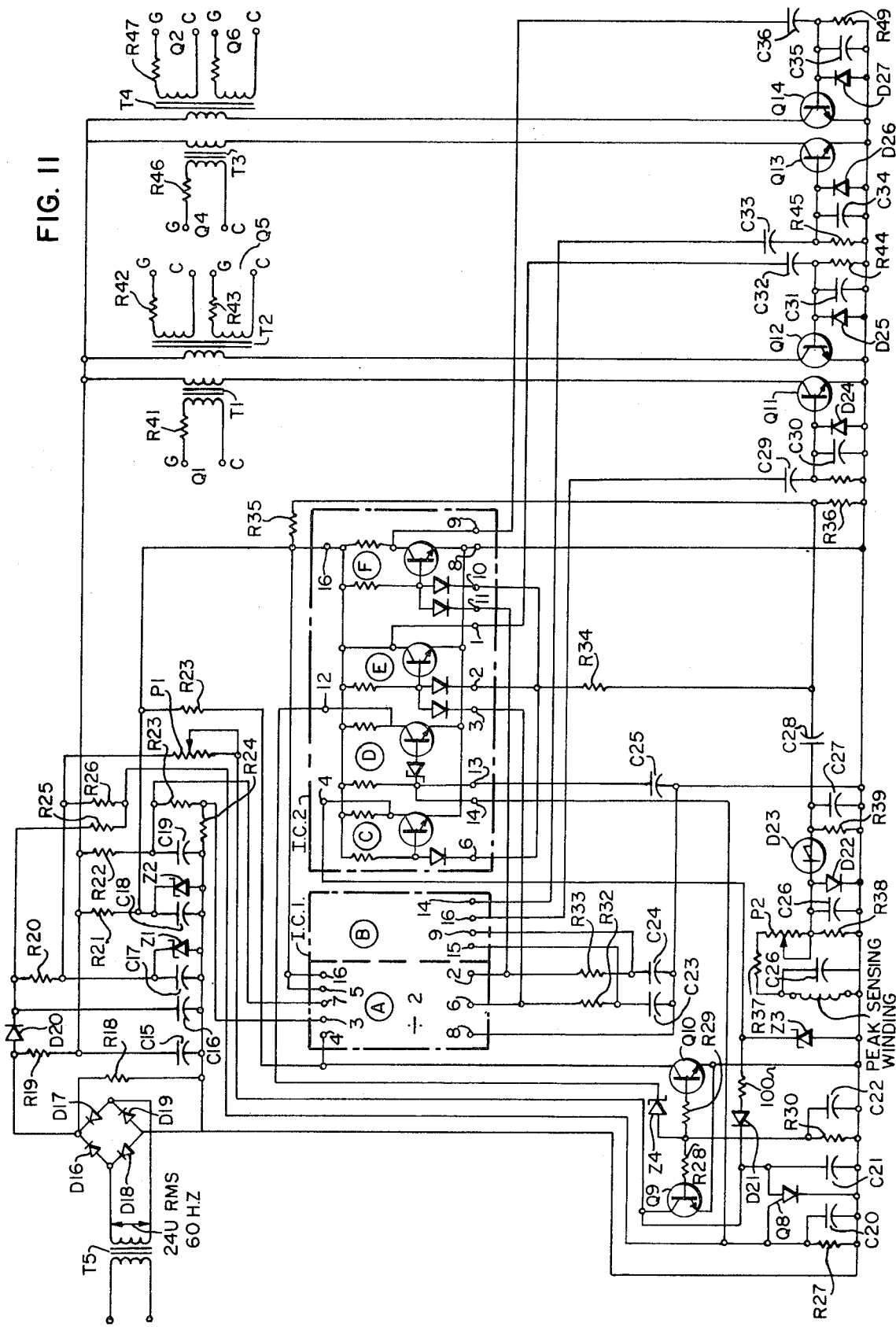
FIG. 11 is a detailed circuit diagram for the control circuit.

FIG. 11 shows the control circuit in full detail. A 24V AC supply is used to power the circuit and this may be obtained either from small transformers associated with individual modules or from a single transformer feeding a cabinet of modules. The supply is rectified and used at three DC levels. The main load on the supply consists of the four trigger output stages which run from an unregulated DC voltage of about 24V. Two regulated supplies are provided by zener diodes, one at 20V to supply the oscillator circuit and one at 12V for the two integrated circuits.

The oscillator circuit is basically as shown previously in FIG. 6. The gate voltage of the unijunction Q8 controls the triggering level of the oscillator and is set by the three resistor divider network, one of which is returned to a unregulated DC supply, and this is used to sense changes in AC supply voltage. Changes in supply voltage result in changes in inverter current and the function of the sensing resistor in the oscillator circuit is to slightly alter the oscillator frequency to compensate for these changes.

The pulse stretching required for the drive to the oscillator clamping transistor is provided in gate D of the quad gate integrated circuit. The clamping level of the integrated gates was too high to allow their use for the oscillator clamp directly, and a separate transistor is used for this purpose. The output of gate D is also used to drive a transistor feeding the oscillator divider (2) circuit. This arrangement was found desirable because of noise problems experienced with the integrated circuit bistable. Although the integrated circuits are high noise immunity types, it was found that feeding the bistable directly from the oscillator gate could result in misoperation of the bistable due to noise. The trouble was caused by the slow pulse recovery rise time appearing at the oscillator gate. This resulted in a slow transition across the bistable threshold level, making it vulnerable to noise just at the time when the inverter was generating switching transients. Feeding the bistable via gate D and the additional transistor gives fast edged pulses at the bistable input and avoids this problem.

Gate C is used to supply pulses to the oscillator timing capacitor as described previously with reference to FIGS. 6 and 7. This gate is driven by the logic 0 periods produced by the peak sensing circuit. The positive output level of the gate is clamped by a zener diode. This is required because the output impedance of the gate would produce a variable resetting level depending on the charge necessary to reset the timing capacitor.

The type 312 integrated circuit comprises two JK flip-flops and one of these, A, is used to divide the output of the oscillator. The K (3) and $\overline{S}$ (7) terminals of the flip-flop are used to assist proper start up of the control circuit. On first switching on, DC levels must be established in the circuit before proper operation occurs. In order to delay output pulses until such conditions exist, the K terminal of the flip-flop, pin 3, is initially held down by the 25 μF capacitor connected to the resistive divider network feeding pin 3. The bistable does not divide under this condition and no output pulses are generated. As the 25 μF charges, it brings the K terminal to a level where the circuit starts to divide. By this time the control circuit is ready for correct operation. The integrated circuits operate from a 12V supply, however, when switching on, and the supply rises slowly from zero. This can result in the bistable changing state, even though oscillator pulses are held off by the delay circuit connected to the K terminal. This low voltage change of state is sufficient to produce spurious output pulses which can fault the inverter. To avoid this the flip-flop $\overline{S}$ terminal, pin 7, is also held down on switch on. This is achieved with the same capacitor used to delay the voltage to the K terminal. A slight voltage difference is required between the $\overline{S}$ and K terminals in order to prevent erratic operation as the bistable starts to divide.

The second flip-flop, B, is slaved to the output of A. This is achieved by connecting the two outputs of A, pins 2 and 6, to the $\overline{S}$ and $\overline{R}$ terminals of B, pins 9 and 15. However, the control of B by A is delayed by RC networks used in the interconnection of the two flip-flops. This delay results in the delayed inverter firing required to minimize thyristor voltage and which was explained previously with reference to FIG. 8. The 'working' thyristors Q1 and Q4 receive their drive pulses via transistor output stages which are driven from B. The 'freewheel' thyristors Q2,Q6 and Q3,Q5 receive drive pulse via output stages which are driven from gates E and F. Gates E and F are driven directly from A which changes state about 15 μS before B does.

Gates E and F both have two inputs (pins 2,3 and 10,11 respectively). One of these comes from the appropriate output from A (pins 6 and 2). The other, which is common to both gates, is normally held positive. This means that changes of state in A results in similar but antiphase changes at the gate outputs (pins 1 and 9). When a gate output goes positive it will drive its associated trigger output stage. When peak sensing pulses occur, logic 0 periods appear at the second input to the gates (pins 2 and 10). This will produce a positive going output only at the gate whose input, from A is a logic 0. The peak sensing pulses are thus steered to the correct pair of thyristors.

The peak sensing circuit employs a 28V trigger diode D23 as a threshold detector. The inverter inductor voltage is measured with a pickup winding on the inductor which provides an isolated signal at about one-tenth the level occurring across the inductor. When this signal produces 28 volts across the trigger diode, the diode breaks over and produces a negative going pulse (logic 0 period) which is fed to gates C, E and F. The voltage level in the inverter at which this occurs is controlled by the potentiometer in the trigger diode circuit.

Following is complete component listing for the circuits as described hereinbefore:

| Reference Identification | Reference Figure | Value or Identification |
| --- | --- | --- |
| C1 | | 5 MFD 330V AC |
| C2 | | 100 MFD 50W V DC |
| C3 | | 500 MFD 400W V DC |
| C4 | | 7 MFD 330V AC 30A RMS 2.5 kHz |
| C5 | | 1.2 MFD 660V AC 4A RMS 2.5 kHz |
| C6 | | .033 MFD 1000V DC |
| C7–C12 | | .02 MFD 200V DC |
| C13,C14 | | .01 MFD 1000V DC |
| C15 | 11 | 250 MFD 50W V DC |
| C16,C17 | 11 | 10 MFD 50W V DC |
| C18 | 11 | 10 MFD 15W V DC |
| C19 | 11 | 25 MFD 15W V DC |
| C20–C22,C25 | 11 | .001 MFD 50V DC |
| C23,C24 | 11 | .015 MFD 50V DC |
| C26,C30,C31 C34,C35 | 11 | .01 MFD 50V DC |
| C27 | 11 | .005 MFD 50V DC |
| C28,C29,C32, C33,C36 | 11 | .02 MFD 50V DC |
| C37 | 11 | .05 MFD 200V DC |
| D1–D3 | 1 | Westinghouse 409M |
| D4–D6 | 1 | Westinghouse 409MR |
| D7,D23 | 1,11 | MPT-28 |
| D8–D13 D20–D22 D24–D27 | 1,11 | 1N4148 |
| D14,D15 | 1 | 1N5054 |
| D16–D19 | 11 | 100V 500 mA Molded Br.Assy. |
| F1,F2 F3 | 1 | 250V 20A Chase-Shawmut A60X30 or Equivalent |
| I.C.1 | 11 | 312 C.J. |
| I.C.2 | 11 | 321 C.J. |

| | | |
|---|---|---|
| L1 | 1 | 5 mH |
| L2 | 1 | 40 μH |
| L3 | 1 | 80 μH |
| L4 | 1 | 5 mH |
| Q1,Q4 | 1 | Westinghouse 201ZD (25 μsec) |
| Q2,Q5 | 1 | Westinghouse 201ZD |
| Q3,Q6 | 1 | Westinghouse 202ZD |
| Q7 | 1 | 2n687 |
| Q8 | 11 | D13T1 |
| Q9,Q10 | 11 | 2N3393 |
| Q11–Q14 | 11 | 2N2219A |
| R1 | 1 | 20 ohms 50W |
| R2 | 1 | 1.2K ½W |
| R3, R27–R29 | 1,11 | 100 ohms ½W |
| R4 | 1 | 22K ½W |
| R5 | 1 | 3.3 ohms 2W |
| R6 | 1 | 20K 5W |
| R7 | 1 | 50 ohms 50w noninductive |
| R8–R13,R23 | 1,11 | 390 ohms ½W |
| R14,R15 | 1 | 100 ohms 50W noninductive |
| R16,R17 | 1 | 3K 25W noninductive |
| R18 | 11 | 300 ohms 5W |
| R19 | 11 | 22 ohms 2W |
| R20 | 11 | 680 ohms ½W |
| R21 | 11 | 200 ohms ½W |
| R22 | 11 | 2.7K ½W |
| R24,R30,R31, R34,R38 | 11 | 2K ½W |
| R25 | 11 | 47K ½W |
| R26 | 11 | 33K ½W |
| R27 | 11 | 15K ½W |
| R32–R33,R37, R40,R44–R45, R49 | 11 | 1K ½W |
| R35,R39 | 11 | 10K ½W |
| R36 | 11 | 27K ½W |
| R41–R43, R46–R48 | 11 | 27 ohms ½W |
| P1 | 11 | 1 Megohm 1/10W |
| P2 | 11 | 2K ½W |
| S1 | 1 | Westinghouse 250V 20A No. 10015 KC |
| T1,T3 | 11 | Pulse Transformer |
| T2,T4 | 11 | Pulse Transformer |
| T5 | 11 | 240/208:24V 750 mA |
| Z1 | 11 | 1 N968 |
| Z2 | 11 | 1 N963 |
| Z3 | 11 | 1 N960 |
| Z4 | 11 | 1 N751 |

Figure 12:
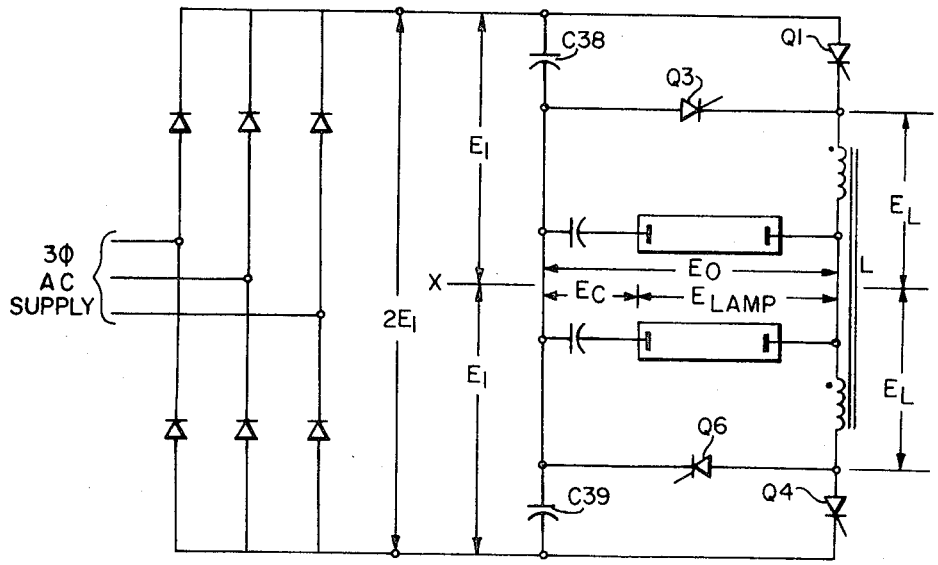
FIG. 12 sets forth an alternative embodiment of the basic inverter circuit as shown in FIG. 1.

An alternative embodiment of an inverter circuit is shown in FIG. 12 wherein the rectifier operates from a 440 volt main and the capacitors C38, 39 form a voltage divider. The potential at point $X$ remains centered between the positive and negative output terminal of the rectifier, and the inverter "sees" only half the rectified 440 volt supply. Operation of the inverter is as follows: Q3 conducting to operate lamps from inductor-stored energy, Q1 conducting to operate lamps from DC supply and store energy in the inductor, Q6 conducting to reverse current and operate lamps from inductor-stored energy, and Q4 conducting to operate lamps from DC supply and store energy in the inductor.

I claim as my invention:

1. In combination, an apparatus for operating capacitor-ballasted discharge devices with predetermined high-frequency AC energy inverted from a DC source, said apparatus comprising:

a. input terminals adapted to be connected to said DC source, and a plurality of pairs of output terminals adapted to have said discharge devices connected thereacross;

b. each of said pairs of output terminals having a capacitor means connected in series therewith to ballast discharge devices connected across said output terminals, and an energy storing and delivering inductor means connected in series with said output terminals;

c. electrical conductors interconnecting said input terminals and said output terminals and having actuatable "on" – "off" switching means connected in circuit therewith;

d. a first circuit comprising a portion of said electrical conductors and said switching means and said inductor means, said first circuit connectable in two operating arrangements to cause a first unidirectional operating current of predetermined direction to flow for a predetermined short period of time through devices connected across said output terminals:

i. in the first of said operating arrangements of said first circuit, said inductor means connects in circuit across said output terminals to operate devices connected thereacross with said first unidirectional current supplied from energy previously stored in said inductor means, ii. in the second of said operating arrangements of said first circuit, said output terminals and said inductor means connect across said input terminals with one of each of said output terminals to continue the flow of said first unidirectional current through devices connected across said output terminals and also to store electrical energy in said inductor means;

e. a second circuit comprising a portion of said electrical conductors and said switching means and said inductor connectable in two operating arrangements to cause a second unidirectional operating current having a direction opposite to that of said first unidirectional current to flow for a short predetermined time through devices connected across said output terminals:

i. in the first of said operating arrangements of said second circuit, said inductor means connects in circuit across said output terminals to maintain operation of devices connected thereacross with said second unidirectional current supplied from energy stored in said inductor means during the previous operation of said second operating arrangement of said first circuit, ii. in the second of said operating arrangements of said second circuit, the other of each of said output terminals connects to said one of said input terminals to continue the flow of said second unidirectional current through devices connected across said output terminals and also to store electrical energy in said inductor means to operate said apparatus during later actuation of said first operating arrangement of said first circuit, with the flow of current into said inductor means during operation of said operating arrangements of said first circuit and said second circuit being in the same direction; and f. actuating means for said switching means which is responsive to an operating condition of said apparatus to sequentially actuate said switches to rapidly and repetitively switch operation of said apparatus from said first operating arrangement of said first circuit, to said second operating arrangement of said first circuit, to said first operating arrangement of said second circuit, to said second operating arrangement of said second circuit, and again to said first operating arrangement of said first circuit, with said switching rate and the resulting rate of current reversal through devices connected across said output terminals being at a sufficiently high predetermined value as to permit said series-connected capacitor means to ballast such devices.

2. In combination, an apparatus for operating in electrical load with predetermined frequency AC energy inverted from a DC source, said apparatus comprising:

a. input terminals one of which is adapted to be connected to the cathode of said DC source and the other of which is adapted to be connected to the anode of said DC source, and at least one pair of output terminals adapted to have a capacitor means and said load connected thereacross;

b. a first pair of gate-controlled solid-state rectifiers having their anodes connected to said one input terminal, the cathode of one of said first pair of rectifiers connected to one of said output terminals, and the cathode of the other of said first pair of rectifiers connected to the other of said output terminals;

c. a second pair of gate controlled solid-state rectifiers, one of said second pair of rectifiers having its anode connected to said one output terminal, and the other of said second pair of rectifiers having its anode connected to said other output terminal;

d. an energy storing and delivering inductor means having one terminal thereof connected to the cathodes of said second pair of rectifiers, and said inductor means having the other terminal thereof connected to said other input terminal;

e. a third pair of gate-controlled solid-state rectifiers, the cathode of one of said third pair of rectifiers connected to said one output terminal, the cathode of the other of said third pair of rectifiers connected to said other output terminal, and the anodes of said third pair of rectifiers connected to said other input terminal;

f. gate-controlling means connected to the gates of said rectifiers for rapidly and repetitively gating said rectifiers in the following sequence to operate said load: (1) said one of said third rectifier pair and said other of said second rectifier pair to operate said load from energy previously stored in said inductor means; (2) said one of said first rectifier pair and said other of said second rectifier pair to operate said load and store energy in said inductor means; (3) said other of said third rectifier pair and said one of said second rectifier pair to reverse the current flow through said load and operate same from energy stored in said inductor means; (4) said other of said first rectifier pair and said one of said second rectifier pair to operate said load and store energy in said inductor means; and repeating the foregoing sequence to rapidly and repetitively reverse the current flow through said load.

3. The apparatus as specified in claim 2, wherein said electrical load comprises a plurality of parallel-connected discharge devices.

4. The apparatus as specified in claim 3, wherein said discharge devices are low-pressure mercury-vapor fluorescent lamps.

5. The apparatus as specified in claim 4, wherein said gate-controlling means is responsive to an operating condition of said lamps to control the gating of said rectifiers and thus to control the operation of said lamps.

6. The apparatus as specified in claim 5, wherein the voltage across said inductor means is sensed as an operating condition of said lamps to control said gate-controlling means.

7. The apparatus as specified in claim 6, wherein said gate-controlling means controls said gating sequence of said rectifiers in such fashion that the period of time of one complete cycle during which said lamps are operated from energy previously stored in said inductor means divided by the time period for one complete cycle is in direct proportion to the potential of said operating lamps divided by the potential of said DC source.

8. The apparatus as specified in claim 1, wherein said actuating means sequentially actuates said switching means in such timed sequence that the period of time of one complete cycle during which said discharge devices are operated from energy previously stored in said inductor means divided by the time period for one complete cycle is in direct proportion to the operating potential of said discharge devices divided by the potential of said DC source.

* * * * *